United States Patent [19]

Adolph et al.

[11] 3,775,823
[45] Dec. 4, 1973

[54] DISPERSION-STRENGTHENED ZIRCONIUM PRODUCTS

[75] Inventors: Eivind Adolph; Niels Hansen; Jens Christian Balling Jensen; John Kjoller, all of Roskilde, Denmark; Paul Donald Parsons; Edward David Hindle; David John Marsh, all of Lancs, England

[73] Assignee: Atomenergikommissionen, Copenhagen, Denmark

[22] Filed: Aug. 18, 1971

[21] Appl. No.: 172,616

[30] Foreign Application Priority Data
Aug. 21, 1970 Denmark.............................. 4318/70

[52] U.S. Cl..................... 29/182.5, 75/211, 75/206, 75/225
[51] Int. Cl. .......... B22f 1/00, B22f 3/00, B22f 3/14
[58] Field of Search...................... 75/211, 206, 225; 29/182.5

[56] References Cited
UNITED STATES PATENTS
3,507,630    4/1970    Rezek .................................... 75/206

OTHER PUBLICATIONS
Lustman et al., The Metallurgy of Zirconium, McGraw-Hill, 1955, pp. 291 TN 799 Z 5L 8

Primary Examiner—Carl D. Quarforth
Assistant Examiner—B. Hunt
Attorney—Beveridge & De Grandi

[57] ABSTRACT

A method of producing dispersion-strengthened zirconium products containing fine particles of yttria, magnesia, cerium oxide or beryllium oxide in a matrix of zirconium or a zirconium alloy. Preferred products are such containing dispersed fine particles of yttria. In the method hydrided zirconium or zirconium alloy in a manner known per se is in a pulverulent state mixed with a fine powder of the oxide, and the mixture is then heated in vacuum with a view to expel hydrogen. Simultaneously or subsequently, the mixture is — in a compressed condition — sintered. This heating operation for expelling hydrogen and sintering the mixture is carried out at a temperature below 800°C, and preferably below 750°C. Prefered dispersion-strengthened zirconium products are characterized by having the metal oxide particles, of an average size not substantially exceeding 0,5μ and preferably between 0,01 and 0,5μ, dispersed in the said matrix having an average particle size not exceeding 5μ and preferably between 1 and 3μ.

18 Claims, 2 Drawing Figures

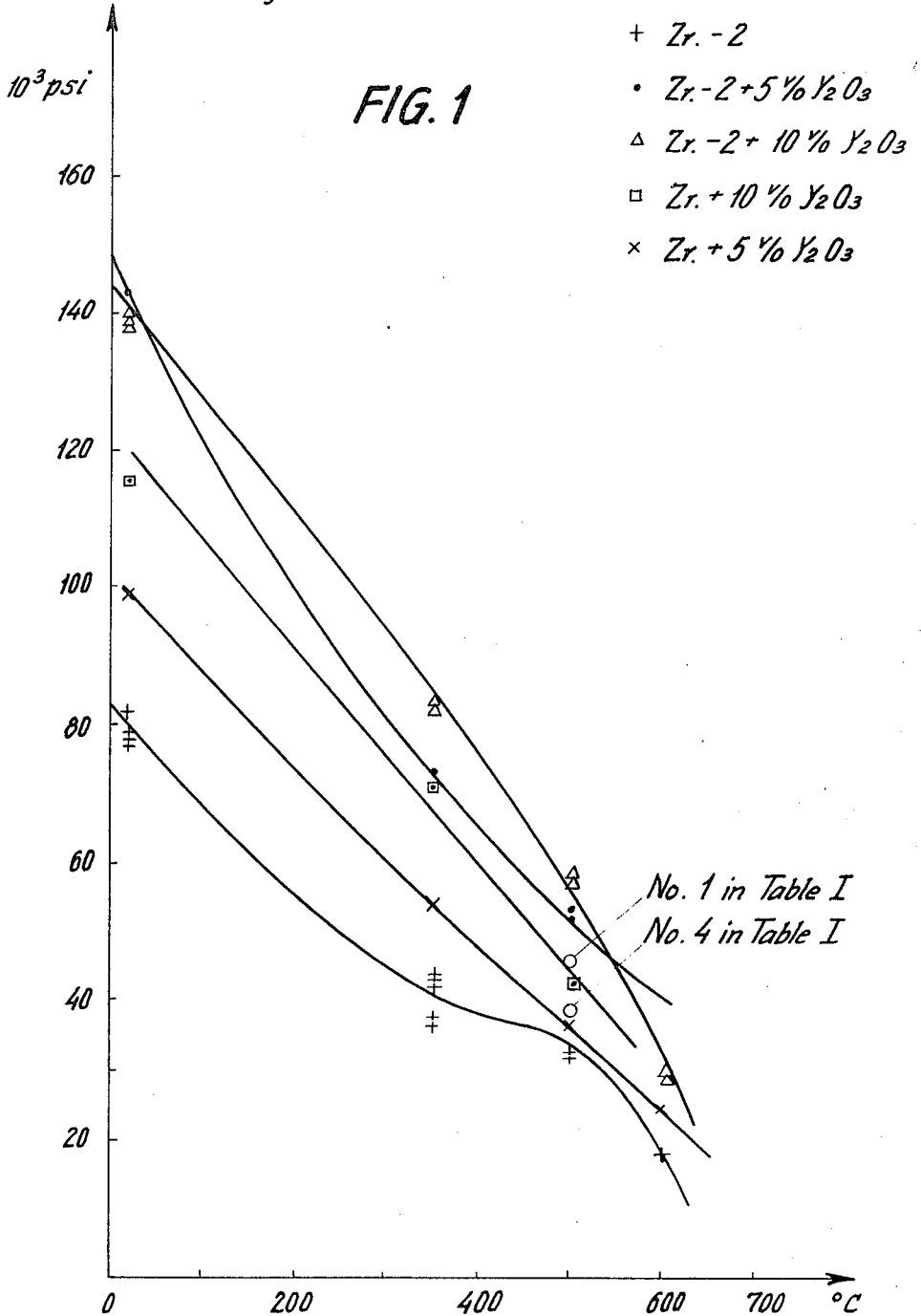

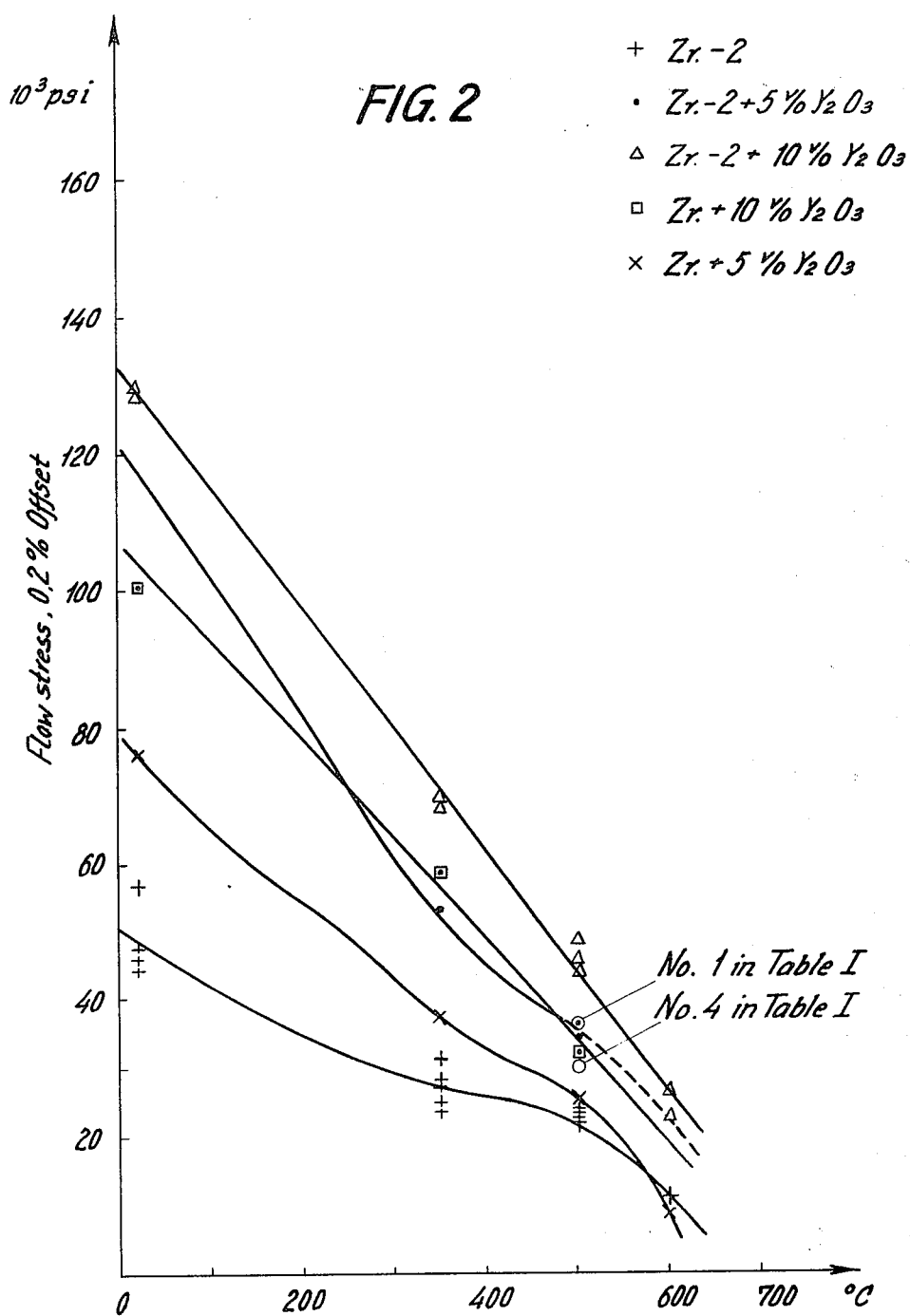

DISPERSION-STRENGTHENED ZIRCONIUM PRODUCTS

BACKGROUND OF THE INVENTION

This invention relates to dispersion-strengthened zirconium products and to a method of producing such products which possess increased strength and at least as good a corrosion resistance as do prior art zirconium materials that have so far been employed in the reactor technique, in particular for pressure tubes and for encapsulating fuel elements.

The dispersion-strengthened zirconium products dealt with here contain fine particles of yttrium oxide ($Y_2O_3$), magnesium oxide, cerium oxide ($CeO_2$ or $Ce_2O_3$) or beryllium oxide dispersed in a zirconium or zirconium alloy matrix. As such a zirconium alloy, zircaloy in particular is employed which contains small amounts of tin, iron and chromium as alloy components.

Prior art dispersion-strengthened zirconium products of this type containing fine $Y_2O_3$ particles as the dispersant have been described by K.C. Antony and H.H. Klepfer in "J. Less-Common Metals," (1965), pages 36 to 46, and by J. Rezek and B.G. Childs in "J. Nuclear Materials," 26 (1968), pages 285-299. When producing these known materials, the starting material is powdery, hydrided zirconium or zirconium alloy which, in an argon atmosphere, is very thoroughly mixed with yttrium oxide powder having a very small average particle size varying from $0.05\mu$ to about $3\mu$ and the quantity of added yttrium oxide powder can be such that, in the dispersion-strengthened product ultimately obtained, it constitutes 5-10 percent by volume, for example. The mixture obtained is compressed and heated in a vacuum to a high temperature with a view to expelling hydrogen to a very low content of hydrogen of about 10-20 ppm or less, and for the purpose of sintering, which process takes several hours. In the course of this process of expelling hydrogen and of sintering, temperatures ranging from 1,000°C to above 1,100°C have been used. While it was a known fact that lower temperatures might be beneficial for the stability of the finest $Y_2O_3$ particles, temperatures in the said range have been regarded as necessary not only for sintering but also with respect to the important effective expelling of hydrogen. The sintered products obtained have been subjected to a subsequent mechanical compacting process by means of extrusion or hot rolling at temperatures varying from 800°-950°C. In the prior art cases dealt with here, an extrusion ratio of 10:1 or a reduction ratio of 50:1 was used.

Although the dispersion-strengthened zirconium products obtained in this fashion are good, there still remains the need for an improvement in the strength properties, and it has now proved that it is possible to obtain such an improvement, without any deterioration in the corrosion properties, by the method according to the present invention.

DESCRIPTION OF THE INVENTION

In the method of the invention, zirconium or a zirconium alloy in a hydrided, powdery state is in a manner known per se mixed thoroughly with powder of yttrium oxide, magnesium oxide, cerium oxide or beryllium oxide, having a very small average particle size and the mixture is heated in vacuum for the purpose of expelling hydrogen and for simultaneous or subsequent sintering in a compressed condition, said heating process for expelling hydrogen and for the purpose of sintering being carried out at a temperature of below 800°C and preferably below aproximately 750°C.

It is surprising that an effective expelling of hydrogen to values of 10-20 ppm or less, together with simultaneous or subsequent sintering, resulting in improved strength properties, is possible when making use of such a lowering of the operating temperature. The sintering operation will normally be carried out, at any rate so far as its final stage is concerned, at a temperature in the region of 650° – 750°C. As has been mentioned, the heating operation is carried out in a vacuum, whereby the pressure may, by way of example, be kept between, or may vary between, $10^{-2}$ and $10^{-5}$ mm Hg. At any rate during the later stage of the sintering process it is best, in order to promote the expelling of hydrogen, to operate at pressures of below about $10^{-3}$ mm Hg.

It is important that the particle size of the powder mixture be kept as small as possible, and the metal oxide employed has preferably an average particle size that does not substantially exceed $0.5 \mu$ and, preferably, is in the region of 0.01 to $0.5 \mu$. At the same time, the particle size of the matrix hydride should not substantially exceed $10\mu$ and should preferably be in the region of $0.5-3 \mu$.

Other embodiments and advantages of the present invention will appear from the following, more detailed description of the invention in connection with the employment of yttrium oxide. All the operations in connection with the present method may be carried out in any conventional equipment used in the manufacture of the said type of dispersion-strengthened products.

The starting materials, hydrided zirconium or hydrided zirconium alloy and yttrium oxide, are first milled to the desired particle size mentioned previously. They may be milled separately and be subsequently mixed, but it is more expedient that they be milled once they are mixed together. By way of example, the milling operation may be carried out in a suitable ball mill and should be effected in an inert atmosphere as, e.g., an atmosphere of pure argon.

If, for some reason or other, it is desired to produce the hydrided zirconium or a hydrided zirconium alloy instead of using the commercial hydrided products, this may be done by heating the metal or alloy (for example, in the shape of rods of a diameter of 4-6 mm.) in an atmosphere of pure hydrogen to a high temperature for several hours. In such process, hydrogen may conveniently be used at a pressure above atmospheric pressure, e.g., 1,000-1,250 mm Hg. At such a hydrogen pressure it has been found to be appropriate to heat to a temperature around 900°C. The heating operation may conveniently take place by increasing the temperature at a rate of about 300°C per hour and, when the desired temperature of around 900°C has been reached, this temperature is maintained for some hours, e.g., for approximately 4 hours, whereupon cooling is effected. It has proved that the best hydriding results are achieved by carrying out the cooling operation in two stages, in that, for instance after an appropriately slow cooling process to a temperature of about 400°C, this temperature is maintained for some hours, conveniently 4-5 hours. The cooling to around 400°C may, for instance, take place at a rate of approximately 50°C per hour. Subsequent to said maintenance period of about 400°C, the cooling to ambient temperatur is proceeded with. The hydrided products so obtained are friable and easily milled in a ball mill.

After the mixture of hydride and yttrium oxide has been milled, the mixture is subjected to the hydrogen expelling and sintering treatment. To this end, the mixture may first be compressed into pellets, e.g., of a diameter of 22 mm and a height of 30 mm, without any concurrent heating taking place, or, at any rate, without any substantial heating, and this compressing operation may conveniently take place at a pressure in the region of 100–130 Kp/mm². The compressed body or bodies are then placed in a conventional sintering furnace, in which the sintering process can be carried out in a vacuum. In carrying out this process it has proved to be expedient to first maintain the temperature for some hours at a lower value of around 600 and up to about 700°C and, thereupon, for some hours at a higher temperature. For example one may proceed in the way that the sintering furnace is evacuated to a pressure of approximately $10^{-2}$ mm Hg, after which the tempertaure is raised to around 660°C in the course of 3–4 hours, following which the pressure and temperature are kept constant for about 15 hours. Subsequently, the pressure is reduced to from $10^{-4}$ to $10^{-5}$ mm Hg and the temperature is raised to approximately 700°C. These conditions are then maintained for about 15 hours, after which the furnace is allowed to cool to ambient temperature.

In place of the said preliminary compression operation without any heating, the powdery mixture as such may first be vacuum-heated and subsequently be sintered under pressure. For this purpose, the powder can be introduced into a press conventionally used for such sintering, following which it is evacuated to a pressure of around $10^{-2}$ mm Hg just as in the previous instance. Thereafter it can be heated, for example, to a temperature of approximately 620°C, and, once enough hydrogen has been expelled so as to render possible the maintenance of a stable vacuum of $10^{-4} - 10^{-5}$ mm Hg, the temperature is raised to 650°–750°C, the pressure on the material in the press being increased to 10–50 kp/mm². These conditions are maintained until the material has been completely sintered together which as previously, will take some hours.

Following the sintering operation, the obtained sinter-product will normally be subjected to a mechanical compacting process by means of extrusion while heated, just as were some of the prior art products mentioned in the foregoing. In the embodiment that is utilized in the present invention, however, a somewhat lower temperature is employed, the compacting operation preferably being carried out at a temperature below 800°C, and preferably below 750°C. In detail, the compacting operation conveniently convenient be carried out by first in conventional manner encapsulating the sintered material completely in copper (using a copper tube having a wall thickness of, for example, 1.2 mm), and then introducing it into an extrusion press. After heating to around 750°C, the material is extruded at a pressure of 70–100 kp/mm². The material is extruded in the form of a rod, an extrusion ratio of 15:1 being employed. The copper is thereupon removed, which may be done by means of dissolving it in nitric acid.

It is also possible to subject the sintered material to a hot rolling operation at a relatively low temperature, e.g., 350°–500°C, just as it is possible to undertake several other, conventional forms of treatment, care having to be taken that there is no, or only an insignificant, particle growth occuring in the material, so that the average particle size remains at the level dealt with in the foregoing. This will have to be ensured, for instance, when it is desired to subject the sintered product, in particular the extruded (possibly hot-rolled) product, to a stress-relieving treatment (or annealing) by employing a suitable thermal treatment. For the extruded product, a suitable form of such thermal treatment can consist in a heating operation in vacuum for some hours, for example, up to 10 hours, at around 600°C.

The quantity of the added yttrium oxide powder may vary within wide limits. However, the quantity of the yttrium oxide will normally constitute not more than about 15 percent by volume of the final product, while the lower limit is determined solely by whether it is possible to obtain any effect by the quantity added. The quantity may be substantially below 5 percent by volume, in certain cases it may be as low as approximately 1 percent by volume.

As a zirconium alloy any zirconium alloy may be employed, but for materials to be used in nuclear reactors, the aforesaid zircaloy-alloy can expediently be used, e.g., zircaloy-2.

In the following table 1, dispersion-strengthened zirconium alloys obtained by the method according to the invention are compared with the prior art, dispersion-strengthened zirconium alloys mentioned in the foregoing. Comparison is made both of products in which the matrix material is zircaloy-2 and products, in which the matrix material is zirconium. Zircaloy-2 is designated as "Zr-2." The products indicated with the numbers, 1, 4 and 7 in the first column, are known products produced in two different laboratories, 1 being produced in one of the laboratories, while 4 and 7 are produced in the other. Products 2, 3, 5 and 6 are produced in conformity with the present method. Product No. 8 is produced by the applicants and, just like product No. 7, merely serves for comparison with the corresponding, dispersion-strengthened products that have a zirconium matrix.

TABLE I

Strenth Properties at 500°C
Zircaloy-2 and Zirconium matrix

| Product | Flow Stress, 0.2% Off-set kp/mm² ($10^3$ psi) | Ultimate Tensile Strength kp/mm² ($10^3$ psi) |
|---|---|---|
| 1. Zr-2 + 10% $Y_2O_3$ | 26.9 (38.3) | 31.2 (44.4) |
| 2. Zr-2 + 5% $Y_2O_3$ | 25.4 (36.0) | 37.0 (52.5) |
| 3. Zr-2 + 10% $Y_2O_3$ | 31.6 (45.0) | 40.8 (58.0) |
| 4. Zr + 10% $Y_2O_3$+) | 21.8 (31.0) | 24.1 (34.2) |
| 5. Zr + 5% $Y_2O_3$ | 17.6 (25.0) | 25.7 (36.5) |
| 6. Zr + 10% $Y_2O_3$ | 23.9 (34.0) | 31.7 (45.0) |
| 7. Zr (sintered+) powder) | 14.3 (20.3) | 17.5 (24.9 ) |
| 8. Zr (sintered powder) | 9.0 (12,8) | 14.5 (20.6) |

+) Tested after sintering.

By comparing the prior art product 1 with product No. 3 produced according to the present method, it will be seen that the flow stress and the ultimate tensile strength of the product according to the invention are substantially higher. If the prior art product No. 4 is compared with product No. 6, it will be seen that a better ultimate tensile strength is obtained in the product according to the invention. The strength of No. 4, as indicated, is tested subsequent to sintering, while product No. 6 is tested following extrusion. This could apparently explain part of the difference in strength. It is seen, however, that the data stated for product No. 7 (produced in the same laboratory as product No. 4) for pure zirconium is much higher than the corresponding data for product No. 8, produced by the applicants. The effective dispersion-strengthening which is achieved by the method according to the invention, is, therefore, much greater than the one achieved by producing product No. 4. Thus, the difference in ultimate tensile strength between product No. 4 and product No. 7 is equal to 6.6 kp/mm$^2$, while the difference in ultimate tensile strength between product No. 6 and product No 8 is 17.2 kp/mm$^2$.

Moreover, a microscopic examination shows that the prior art products Nos. 1 and 4 have a matrix, the particle sizes of which vary from 5 to 10$\mu$, while the products Nos. 2, 3, 5 and 6 according to the invention have a matrix, the particle sizes of which vary from 1 to 3$\mu$.

Furthermore, in Table II as detailed below, the corrosion properties of Zr-2 + yttrium oxide (dispersion-strengthened product according to the invention) have been stated and compared with some commercial zircaloy-2 products. It appears that the corrosion resistance of the products according to the invention is at least as high as is the case with the prior art products.

TABLE II

Increase in Weight in mg/dm$^2$ of different alloys exposed to water and steam at 400°C and to pressure of up to 100 atmospheres.

| Material | Increase in weight after 3 days | Appearance | Increase in weight after 14 days | Appearance |
|---|---|---|---|---|
| Zr-2 rod, Commercial Product | 11 18 | shiny black | 67 | grey |
| Zr-2 rod, Powder Metallurgical Product | 19 12 | shiny black | 38 | black to grey |
| Zr-2 + 5 v/o Y$_2$O$_3$ | 16 16 | bright black | 45 | black with white spots |
| Zr-2 — Tube Control | 19 | shiny black | | |

EXAMPLES

| | Composition of rods | | | |
|---|---|---|---|---|
| | Zr+5v/oY$_2$O$_3$ | Zr+10v/oY$_2$O$_3$ | Zr-2+5v/oY$_2$O$_3$ | Zr-2+10v/oY$_2$O$_3$ |
| Weight of hydride, g | 107.88 | 102.30 | 107.88 | 102.30 |
| Weight of Y$_2$O$_3$, g | 4.11 | 8.21 | 4.11 | 8.21 |
| Milling time, min | 2×30 | 2×30 | 2×60 | 2×60 |
| Cold compression pressure, kp./mm.$^2$ | 127 | 127 | 127 | 127 |
| Sintering temperature, °C | 700 | 700 | 700 | 700 |
| Sintering time, hrs | 15 | 15 | 15 | 15 |
| Sintering pressure, mm. Hg | 3×10$^{-5}$ | 2×10$^{-5}$ | 1×10$^{-5}$ | 2×10$^{-5}$ |
| Extrusion temperature, °C | 750 | 750 | 750 | 750 |
| Max. pressure, kp./mm.$^2$ | 78 | 84 | 102 | 91 |
| Min. pressure, kp./mm.$^2$ | 55 | 72 | 58 | 56 |
| Ratio | 15:1 | 15:1 | 15:1 | 15:1 |
| Flow stress, kp./mm.$^2$: | | | | |
| Ambient temp | 53 | 71.8 | 83.6 | 90 |
| 350 | 59 | 47.2 | 37.6 | 49.5 |
| 500 | 17.7 | 26.3 | 26.5 | 34.3 |
| Ultimate tensile strength kp./mm.$^2$: | | | | |
| Ambient temp | 74.3 | 83.0 | 99.5 | 97.6 |
| 350 | 39.1 | 60.3 | 51.5 | 58.2 |
| 500 | 25.3 | 36.3 | 36.8 | 41.5 |
| Elongation, percent: | | | | |
| Ambient temp | 10.7 | 2.3 | 2.7 | 1.3 |
| 350 | 16 | 9.0 | 15.2 | 10 |
| 500 | 23.5 | 25.7 | 18.3 | 19 |
| Rupture time for stress: | | | | |
| Kp./mm.$^2$ | 17 | 12.5 | | |
| Hours | 83 | 25.2 | | |

It is also shown that the yttrium oxide phase of the prior art products consists of comparatively large particles. As regards product No. 4, they were measured to vary from 0.05 to 0.6 $\mu$, the average (linear) size being 0.2 $\mu$. For the sake of comparison, the particle size of the yttrium oxide phase of products Nos. 2, 3, 5 and 6 was measured as varying from less than 0.01 to 0.5 $\mu$, with an average (linear) size of 0.04 $\mu$.

The products according to the invention create an impression of being fully dense. They have good creep properties. Their strength properties are superior to those of the prior art products at temperatures of up to 600°C and, presumably, still higher temperatures.

In the accompanying drawings;

FIG. 1 shows the variation in ultimate tensile strength as function of the temperature, for the products Nos. 2, 3, 5 and 6 stated in Table I, as well as for a Zr-2 alloy produced by making use of a conventional melting technique and subjected to a final extrusion operation identical with the operation, to which the products Nos. 2, 3, 5 and 6 have been subjected, and FIG. 2 shows the variation in the flow stress as a function of the temperatures for the same products.

In both figures, the data regarding products Nos. 1 and 2 stated in Table I is marked as well.

What we claim are:

1. A method of producing dispersion-strengthened zirconium products containing fine metal oxide particles dispersed in a matrix of a material selected from the group consisting of zirconium and zirconium alloys, comprising mixing the matrix material in a hydrided, powdery condition thoroughly with a powder of a metal oxide selected from the group consisting of yttrium oxide, magnesium oxide, cerium oxide and beryllium oxide and having a very small average particle size, and heating the mixture in vacuum for expelling hydrogen and for sintering the mixture, said heating being carried out at a temperature of below 800°C., and a temperature above 600° until the residual hydrogen in the sintered material is below about 20 ppm, and thereafter subjecting the sintered material to mechanical compacting treatment at an elevated temperature below 800°C.

2. A method as claimed in claim 1, in which the second of the two stages of the sintering operation, is carried out at a temperature in the region of 650°–750°C.

3. A method as claimed in claim 1, in which the powder mixture is kept at a lower temperature ranging from 600°C. up to approximately 700°C., for a first period of time, and subsequently, at a higher temperature for a second period of time.

4. A method as claimed in claim 1, in which the second stage of the sintering operation is carried out at a pressure below approximately $10^{-3}$ mm Hg.

5. A method as claimed in claim 1, in which the metal oxide employed has an average particle size which does not substantially exceed 0.5 $\mu$.

6. A method as claimed in claim 1, in which the metal oxide is added in a quantity that constitutes not more than 15 percent by volume of the final product.

7. A method as claimed in claim 1, in which the hydride employed has an average particle size which does not substantially exceed 10 $\mu$.

8. A method as claimed in claim 1, in which the sintered product is subjected to a subsequent, mechanical compacting process by means of extrusion while heated to a temperature of below 800°C.

9. A method as claimed in claim 1, in which hydrided zirconium alloy powder is used as matrix powder.

10. A dispersion-strengthened zirconium product containing particles of a metal oxide selected from the group consisting of yttrium oxide, magnesium oxide, cerium oxide and beryllium oxide, having an average particle size that does not substantially exceed 0.5 $\mu$, and ranging, by way of preference, between 0.01 and 0.5 $\mu$, and being dispersed in a sintered matrix of a material selected from the group consisting of zirconium and zirconium alloys having an average particle size not exceeding 5 $\mu$, and to a predominant degree preferably lying in the range of 1 to 3 $\mu$.

11. A dispersion-strengthened zirconium product containing particles of yttrium oxide having an average particle size that does not substantially exceed 0.5 $\mu$, and ranging, by way of preference, between 0.01 and 0.5 $\mu$, and being dispersed in a sintered matrix of a material selected from the group consisting of zirconium and zirconium alloys having an average particle size not exceeding 5 $\mu$, and to a predominant degree preferably lying in the range of 1 to 3 $\mu$.

12. The method of claim 1 wherein the metal oxide is yttrium oxide.

13. The method of claim 1, wherein the mixture of metal oxide particles and matrix material is subjected to a compression operation prior to the steps of heating in vacuum and sintering.

14. The method of claim 12, wherein the mixture of metal oxide particles and matrix material is subjected to a compression operation prior to the steps of heating in vacuum and sintering.

15. The method of claim 1 wherein the sintering step is carried out in two stages.

16. A method of claim 1, in which the metal oxide employed has an average particle size which lies in the range of from 0.01 $\mu$ to 0.5 $\mu$.

17. The method of claim 1, in which the hydride employed has an average particle size which lies in the range of from 0.5$\mu$ to 3$\mu$.

18. The method of claim 1 wherein heating the mixture in vacuum for expelling hydrogen and for sintering the mixture is performed at temperatures below 750°C.

* * * * *